United States Patent [19]

Yoshida et al.

[11] Patent Number: 4,621,194
[45] Date of Patent: Nov. 4, 1986

[54] RADIATION DETECTING APPARATUS

[75] Inventors: Minoru Yoshida, Tokyo; Hiromichi Yamada, Hino; Yoko Uchida, Kawasaki; Hideki Kohno, Tokyo; Hiroshi Takagi, Matsudo, all of Japan

[73] Assignees: Hitachi, Ltd.; Hitachi Medical Corporation, both of Tokyo, Japan

[21] Appl. No.: 517,695

[22] Filed: Jul. 27, 1983

[30] Foreign Application Priority Data

Sep. 10, 1982 [JP] Japan .................. 57-156748

[51] Int. Cl.⁴ .................................. G01T 1/22
[52] U.S. Cl. .......................... 250/367; 250/370
[58] Field of Search .................. 250/366, 367; 250/370 I, 363 S

[56] References Cited

U.S. PATENT DOCUMENTS 4,414,473 11/1983 Hoffman et al. .................. 378/19

Primary Examiner—Janice A. Howell
Attorney, Agent, or Firm—Antonelli, Terry & Wands

[57] ABSTRACT

A multielement scintillation radiation detector comprises a scintillator and a photosensitive detector, wherein to optically isolate between the adjacent radiation detectors, a thin light reflecting sheet on which a sponge material is attached is used to closely adhere to radiation shielding plates for partitioning each radiation detector.

17 Claims, 5 Drawing Figures

4,621,194

RADIATION DETECTING APPARATUS

BACKGROUND OF THE INVENTION

The present invention relates to a radiation detecting apparatus using a scintillator which emits light when the radiation such as X rays, γ rays, or the like when radiated, and, more particularly, to a radiation detecting apparatus for an X-ray computerized tomography scanner (hereinafter, referred to as an X-ray CT).

In a radiation examining apparatus such as an X-ray CT, it is necessary to provide a radiation detector having high sensitivity since in, for example the medical field it is imperative to minimize exposure of patients to X rays the radiation detector with a relatively large S/N ratio. In the X-ray CT, X rays, a strength of which is changed by passing through the body to be examined, are simultaneously detected by a plurality of radiation detectors. In such a case, even if the energy strength of X rays changes over a wide range, it is necessary for each detector to represent substantially the same characteristic as other detectors against X rays. In other words, it is necessary to match the characteristics of each detector.

A radiation detector of the aforementioned type has been proposed which comprises a combination of a scintillator for transforming the energy of radiation into the visible light or near ultraviolet radiation, near infrared radiation, and a photoelectric device for converting the light radiated from the scintillator into an electric signal.

In, for example, U.S. Pat. No. 4,317,037, a detector is proposed which includes a combination of a scintillator consisting of the particles of scintillator material and a silicon photodiode. While the characteristics of the individual scintillator material particules may slightly differ, they are sufficiently mixed and used as single scintillator, so as to reduce a variation of the characteristics as a scintillator. In the proposed arrangement the light radiated from inside of the scintillator can be easily directed or supplied toward the outside by including the scintillator or distributing the scintillator into one or more layers.

In commonly assigned U.S. application Ser. No. 313,171, a radiation detector using powder scintillator is proposed for further improving the S/N ratio.

A radiation detecting apparatus employed in a radiation examining apparatus such as an X-ray CT is constructed in such a manner that a number of the aforementioned type of radiation detectors are arranged through a radiation shielding plate using a thin plate of, for example W, Ta, Mo, or the like each of which exhibit a high radiation absorbing property.

Conventional photoelectric devices may take the form of, for example, a photomultiplier tube, microchannel plate photodetectors, semiconductor photosensitive device (Si photodiode, etc.), or the like. For increasing an effectiveness of the radiation detector for the X-ray CT of the high density and multielement type, a small semiconductor photosensitive device is generally employed so as to permit the construction of a high density photodetector.

To enable a partitioning between each of the adjacent (small radiation detectors) in the high density scintillation radiation detector and multielement type a combination of the scintillator and photoelectric device is employed.

An object of the present invention resides in providing a radiation detector which effectively uses the incoming radiation, has an excellent productivity, and is reliable when installed and used in the radiation detecting apparatus, thereby eliminating the drawbacks in production, performance and structure in the prior-art radiation detector.

To accomplish the above object, in accordance with the present invention, a plurality of radiation detectors each consisting of a scintillator and a photosensitive detector divided by radiation shielding plates, with a cushioning material being employed to make a light reflecting sheet come into close contact with the radiation shielding plates for optically isolating each of the adjacent radiation detectors.

DETAILED DESCRIPTION

Figure 1:
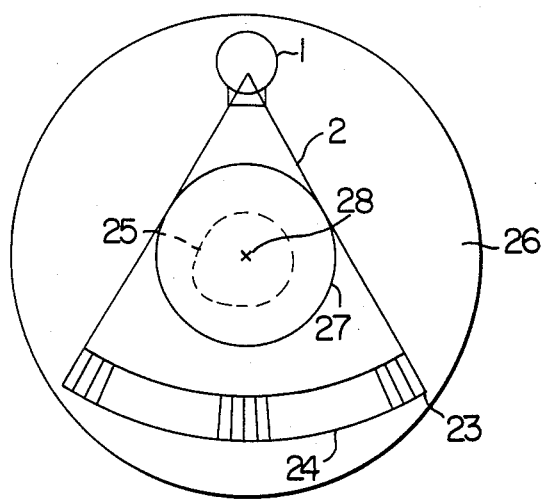
FIG. 1 is a schematic diagram showing an example of an X-ray CT scanner.

Referring now to the drawings wherein like reference numerals are used throughout the various views to designate like parts and, more particularly, to FIG. 1, available X-ray CTs include a vertically disposed turntable member 26 having an aperture 27 at a central portion thereof in which a patient to be examined such as, for example, a human, is placed. An X-ray radiating source is attached to one end at the outer periphery of the turnable member 26, with an X-ray beam 2, radiated from the X-ray radiating source 1, spreading out like an open fan and passing through the body 25. The X-ray beam is detected by a radiation detecting apparatus 24 disposed at the other end of the turntable member 26. The radiation detecting apparatus 24 includes an aray of thirty to twelve hundred radiation detectors 23 having the same performance characteristics arranged along a circular arc around the X-ray radiating source 1, with the radiation detectors being spaced from each other at a predetermined angle of, for example, 1°. The turntable member 26 is rotated around a center axis 28 for allowing the X-ray radiating source 1 and radiation detecting apparatus 24, attached to the turntable member 26, to rotate around the body 25 thereby measuring the output of each radiation detector 20 for each of the predetermined angles. By virtue of this arrangement, it is possible to reconstitute the cross sectional image of the body 22 from the measured values.

Although the radiation detecting apparatus 24 is disposed along a circular arc in FIG. 1, the radiation detectors 23 may be arranged linearly when the X-ray beam spreads out a narrow open fan pattern. Moreover, it may be possible to arranged and fix the radiation detecting apparatus 24 around an entire circumference of the turntable member 26 without attaching the detecting apparatus 24 to the turntable member 26 and to rotate only the X-ray radiating source 1 together with the turntable member 26.

As shown in FIG. 8, a conventional scintillator crystal 6 is optically coupled to a Si photodiode 7, with the scintillator crystal 6 and the photodiode 7 being arranged in a predetermined interval and sandwiched or disposed between a printed circuit board 8 and a douser 5 fashioned as, for example, a light shielding plate. A plurality of thin grooves are formed in opposite surfaces of the printed circuit board 8 and the douser 5, and partition plates 9 such as, for example, radiation shielding plates, are interposed between the grooves to provide for a partition between each device to prevent light leakage between neighboring devices.

Figure 2:
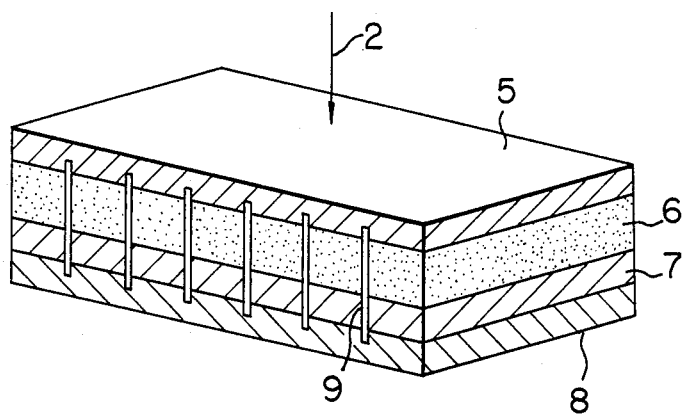
FIG. 2 is a perspective view of a conventional scintillation radiation detector.

Since the douser 5 also functions as an entrance 4 in coming radiation, it is desirable for the douser 5 to be made of a very thin material having a lower radiation absorbing property; however, in order to enable the formation of the grooves for accommodating the partition plates 9, it is necessary for the douser 5 to have a thickness of at least 1 mm. A disadvantage of this construction resides in the fact that the strength of radiation is reduced by several percentages thereby causing a reduction in an effective use coefficient of a dosage of radiation to be detected. Moreover, with a construction such as illustrated in FIG. 2, an extra machining process is required to form the grooves, which additional process adversely affects the production thereof and increases the overall manufacturing costs.

Figure 3:
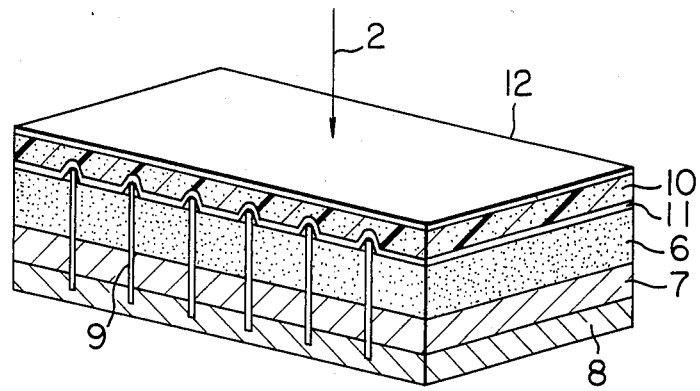
FIG. 3 is a perspective view of an embodiment of a scintillation radiation (X-rays detector of a high density and multi-element type using a monocrystal scintillator for an X-ray CT scanner constructed in accordance with the present invention.

As shown most clearly in FIG. 3, in accordance with the present invention, multi-element detectors are partitioned by partition plates 9 forming separating walls between the adjacent detectors whereby each detector is independent, with the partition plates 9 being formed as a metal plate having a thickness of 0.05–0.2 mm made of a material having a higher radiation absorbing property, such as, for example, W, Mo, Ta. A plurality of grooves are formed in the wiring or printed circuit board 8, with the grooves being disposed at regular intervals of, for example 1–6 mm. A partition plate 9 is inserted into the respective grooves in the wiring board 8 and fixed therein. The wiring board 8 is a special printed wiring board having the grooves in one surface thereof and the an electric signal wiring pattern in opposite surface thereof. The semiconductor photosensitive detector 7 is inserted between the grooves and the signal line is connected by the solder to the electric signal wiring pattern on the rear surface, so that the semiconductor photosensitive detector 7 is electrically and mechanically fixed to the wiring board 8. A material having a relatively high refractive index such as, for example, Si grease, or an epoxy resin, (which is omitted in FIG. 3, is used on the photoelectric surface of this semiconductor photosensitive detector 7. A monocrystal scintillator 6 of, for example, CsI, CdWO$_4$ or ZnWO$_4$ is, optically coupled to the photoelectric surface of the semiconductor photosensitive detector 7. A light reflecting sheet 11 is provided on the surface on the radiation incident direction side of the scintillator 6 to reflect the light emitted from the scintillator 6, thereby effectively being introduced onto the photoelectric surface of the semiconductor photosensitive detector 7. The light reflecting sheet 11 is constituted by thin sheet of aluminum having a thickness of 20–50 $\mu$m with a mirror surface, or a thin sheet having a higher reflectance made of a high polymer resin sheet (10–50 $\mu$m in thickness) on which aluminum is evaporation-deposited to obtain the mirror surface. The light reflecting sheet 11 is pressed by a douser and pressing plate 12 such as, for example an Al plate having a thickness of 0.2–0.5 mm, from the opposite side of as, for example, a high molecular foaming styrene or sponge which includes a great amount of air. In this case, the partition plates 9 protrude by approximately 0.5–1 mm above the surface of the scintillator 6.

The incoming radiation to the detector first enters the douser and aluminum pressing plate 12, which easily transmits but hardly absorbs the radiation. After the radiation has been transmitted through the plate 12, it reaches the cushioning material 10 consisting substantially of the air which hardly absorbs the radiation. After passing through the cushioning material 10, it is further transmitted through the light reflecting plate 11 and reaches the scintillator 6. The loss due to absorption of the radiation so far is not more than 1% to 3% and is less than that of the conventional detector. Since the light reflecting sheet 11 is thin, it is easily deformed in accordance with the concave and convex portions of the scintillator 6 and partition plates 9. Furthermore, since the sheet 11 is pressed by the cushioning material 10 and douser and pressing plate 12, it closely adheres to the scintillator 6 and partition plates 9. Thus, the light reflecting sheet 11 acts to reflect the light emitted from the scintillator 6 and optically isolates the neighboring detectors. Therefore, there is no need to form the grooves in which the partition plates for isolation are inserted as in the conventional manner, resulting in eliminating the process of cutting the grooves. The radiation which has reached the scintillator 6 is converted into the light in the scintillator 6, and the light is detected by the semiconductor photosensitive detector 7 and is removed as an electric signal. Therefore, the level of the electric signal removed is proportional to the amount of radiation incidence.

Figure 4:
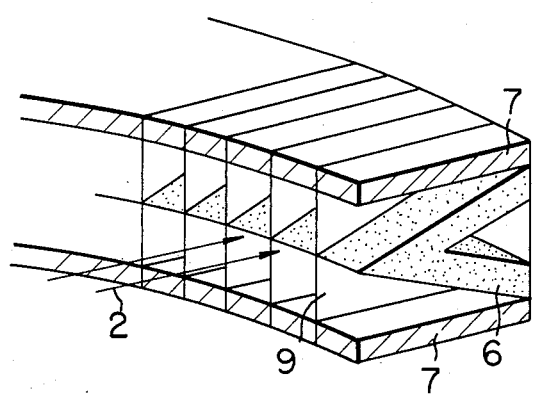
FIG. 4 is a perspective view of a radiation detector using a powder scintillator.

In the embodiment of FIG. 3, a monocrystal scintillator is used; however, the present invention is not limited to this, but can be applied to the case where the particles (fluorescent material powder) are used as the scintillator. FIG. 4, a radiation detector comprises: the scintillator 6 (of which the fluorescent powder was solidified by a binder) which is excited by the radiation 2 such as X rays, $\gamma$ rays or the like and which converts this radiation into the light; and the photosensitive detector 7 to detect a light emission output from this scintillator. A plurality of such radiation detectors are arranged through the radiation shielding plate 9 consisting of the thin plate (0.05–0.3 mm$^t$) made of a material having a higher radiation absorbing property, such as W, Ta, Mo, etc. The scintillator 6 is fixedly secured to the radiation shielding plate 9.

Figure 5:
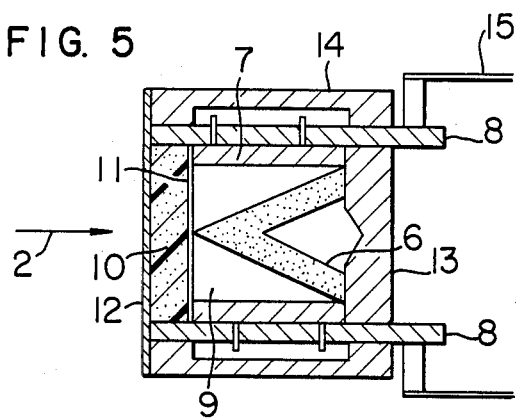
FIG. 5 is a cross sectional view of an embodiment of a multi-element scintillation detector of the present invention using the radiation detector of FIG. 4.

Referring to FIG. 5, the light emitted from the scintillator 6 is taken out from the incident side of X rays and introduced to the semiconductor photosensitive detector 7. Therefore, the light reflecting sheet 11 is closely adhered not to the scintillator 6 but to only the partition plates 9, thereby optically isolating the adjacent detectors and causing the light emitted from the scintillator 6 to be reflected. The radiation detector of FIG. 5 also includes a spacer 13; a supporting metal fitting 14; and an electric signal supply cable 15.

According to the of FIG. 5 embodiment, the grooves in the douser 5 in the prior-art detector are unnecessary; therefore, a machining of the parts is facilitated thereby reducing production cost. In addition, since there is no need to form the grooves as compared with the conventional douser 5, a total thickness of the douser and pressing plate 12 and light reflecting sheet 11 can be reduced to be 1/6 to 1/10 of that of the prior-art douser. Hence, the absorption of the incoming radiation is very little and the loss of radiation incidence is also small. This causes an increase in the detection efficiency of the radiation detector.

According to the present invention, in the radiation detector, particularly in the X-ray computerized tomography scanner (X-ray CT scanner) comprising an array of a number of radiation detector using the scintillator which emits the light by the radiation such as X rays, γ rays or the like, the loss of the X-ray incidence is reduced to be about 1-3%, which is ½ to ⅓ as compared with the conventional radiation detecting method, so that an excellent picture quality is obtained. Furthermore, the component parts are simple in construction, so that the cost of parts is about 1/100 as compared with the conventional working method and the processing time can be also reduced.

We claim:

1. A radiation detecting apparatus comprising:
   a board having a plurality of grooves formed at regular intervals on one main surface thereof;
   radiation shielding plates respectively inserted into respective ones of said grooves;
   scintillators disposed in spaces defined by said radiation shielding plates and attached thereto;
   photosensitive detectors for respectively receiving light emitted from respective ones of said scintillators and being attached to said scintillators;
   a reflecting sheet for reflecting the light emission from each of said scintillators to said photosensitive detectors, said reflecting sheet is formed of a high polymer resin sheet having a thin aluminum layer forming a mirror surface on one main surface of the reflecting sheet; and
   a light shielding plate for closely attaching said reflecting sheet through a cushioning material to said radiation shielding plates, whereby said scintillators are optically isolated from each other by the reflecting sheet and said cushioning material.

2. A detecting apparatus according to claim 1, wherein said light shielding plate comprises an aluminum sheet with a mirror surface.

3. A detecting apparatus according to claim 2, wherein said aluminum sheet has a thickness of between 0.2-0.5 mm.

4. A detecting apparatus according to claim 1, wherein said aluminum layer is evaporation-deposited on said high polymer resin sheet.

5. A detecting apparatus according to claim 1, wherein said cushioning material consists essentially of one of a high molecular weight foaming styrene or a sponge material.

6. A detecting apparatus according to claim 1, wherein said high polymer resin sheet has a thickness of between 10-50 μm.

7. A radiation detecting apparatus according to claim 1, wherein said light shielding plate presses against said cushioning material to cause the light reflecting sheet to deform around each of said radiation shielding plates.

8. A radiation detecting apparatus comprising:
   a board having a plurality of grooves formed at regular intervals on one main surface thereof;
   radiation shielding plates respectively inserted into respective ones of said grooves;
   scintillators disposed in spaces defined by said radiation shielding plates and attached thereto;
   photosensitive detectors for respectively receiving light emitted from respective ones of said scintillators and attached thereto;
   a reflecting sheet for reflecting light emission from each of said scintillators to said photosensitive detectors, said reflecting sheets being made of thin aluminum sheets with a mirror surface on one main surface thereof; and
   a light shielding plate for closely attaching said reflecting sheet through a cushioning material to said radiation shielding plates whereby said scintillators are optically isolated from one another by said reflecting sheet and said cushioning material.

9. A detector apparatus according to claim 8, wherein said light shielding plate comprises an aluminum sheet with a mirror surface.

10. A detecting apparatus according to claim 9, wherein said aluminum sheet has a thickness of between 0.2-0.5 mm.

11. A detecting apparatus according to claim 9, wherein said thin aluminum sheet has a thickness of between 20-50 μm.

12. A detecting apparatus according to claim 8, wherein said cushioning material consists essentially of one of high molecular weight foaming styrene or a sponge material.

13. A detecting apparatus according to claim 8, wherein said light shielding plate presses against said cushioning material to cause the light reflecting sheet to deform around each of said radiation shielding plates.

14. A radiation detecting apparatus comprising:
    a plurality of radiation detectors each including a scintillator and a photosensitive detector for receiving light emitted from said scintillator, said radiation detectors being arranged by being partitioned by radiation shielding plates;
    a light reflecting sheet for reflecting said light emission to said photosensitive detectors, said reflecting sheet being made of a thin sheet of aluminum with a mirror surface; and
    a light shielding plate for closely attaching said light reflecting sheet through a cushioning material to said radiation shielding plates, said cushioning material including air therein, whereby said scintillators are optically isolated from one another by said reflecting sheet and said cushioning material.

15. A detecting apparatus according to claim 14, wherein said thin sheet of aluminum has a thickness of between 20 and 50 μm.

16. A detecting apparatus according to claim 14, wherein said cushioning material is a high molecular weight foaming styrene or sponge material having a thickness greater than that of the light reflecting sheet.

17. A detecting apparatus according to claim 14, wherein said light shielding plate presses against said cushioning material to cause the light reflecting sheet to deform around each of said radiation shielding plates.

* * * * *